Figure 1:
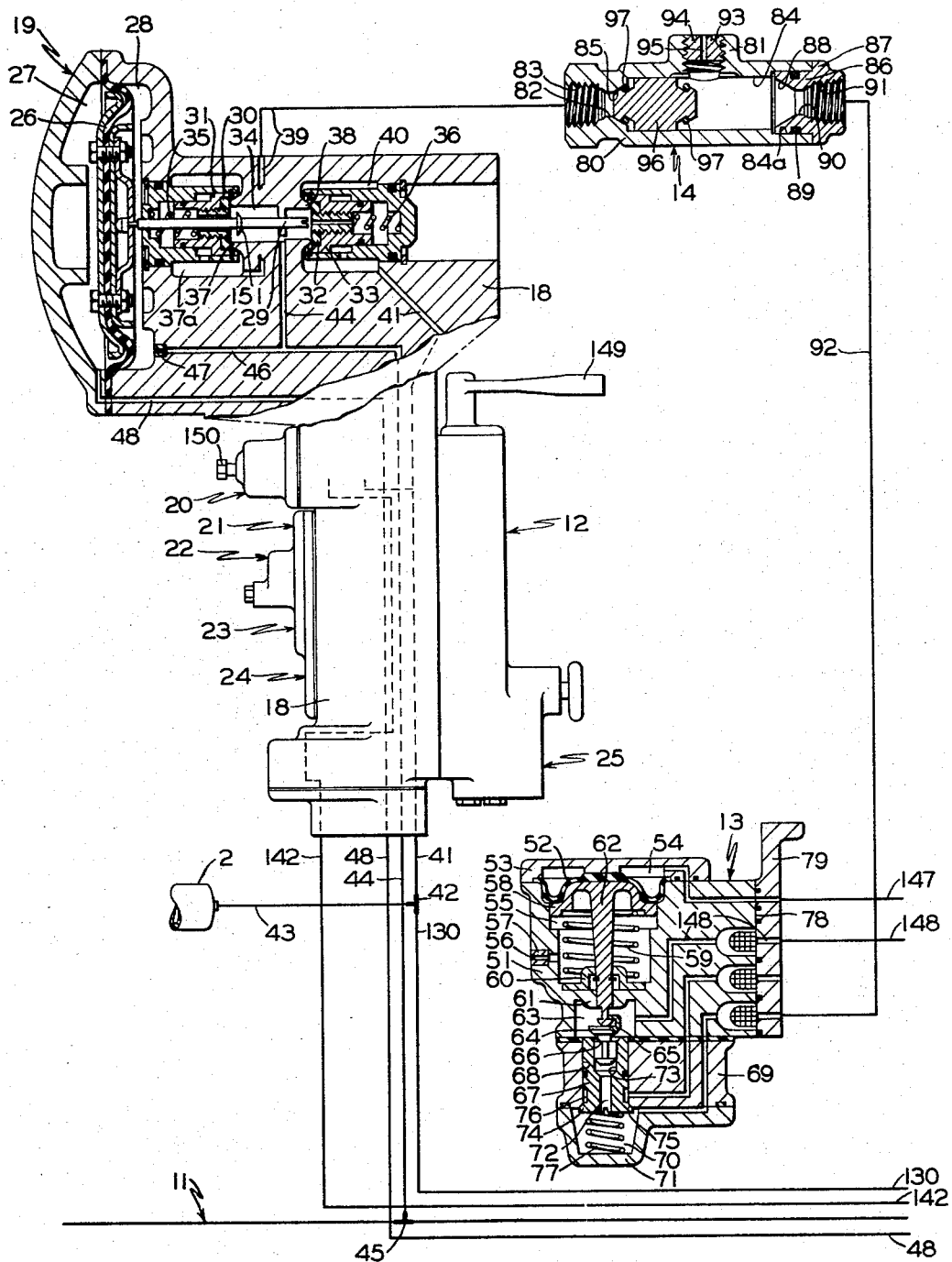

INVENTOR.
Robert J. Worbois

INVENTOR.
Robert J. Worbois
BY A. A. Steinmiller
Attorney

United States Patent Office 3,275,382
Patented Sept. 27, 1966

3,275,382
RAILWAY FLUID PRESSURE BRAKE SYSTEM WITH MEANS ASSURING MINIMUM BRAKE PIPE REDUCTION FOR BRAKE APPLICATION
Robert J. Worbois, Irwin, Pa., assignor to Westinghouse Air Brake Company, Wilmerding, Pa., a corporation of Pennsylvania
Filed Oct. 26, 1964, Ser. No. 406,379
10 Claims. (Cl. 303—15)

This invention relates to automated locomotive fluid pressure brake apparatus of the type embodying a brake control center for receiving electrical impulses derived from signal and track circuits and a speed control axle-driven pulse generator, impulses from which actuate electro-pneumatic brake apparatus to control braking on the locomotive and a train hauled thereby, and, more particularly, to such automated locomotive fluid pressure brake apparatus for assuring the proper degee of brake pipe pressure reduction to cause a minimum brake application notwithstanding that the train brake pipe extending from the locomotive through the train of cars is not fully charged to the normally carried brake pipe pressure at the time an impulse for effecting a minimum brake application is received by the brake control center.

Automated locomotive fluid pressure brake apparatus, in addition to the brake control center, embodies the same type of brake valve device used in conventional manually controlled locomotive brake equipment. This brake valve device has a relay valve device for controlling variations in the pressure in the brake pipe extending from the locomotive through the train. The brake valve relay valve device comprises a supply valve and an exhaust valve operated by a movable abutment, subject differentially on its opposite sides to pressure in an equalizing reservoir and to the pressure in the brake pipe, to effect a corresponding increase or a decrease in brake pipe pressure accordingly as equalizing reservoir pressure is increased or decreased under the control of the brake control center in response to the electrical impulses received thereby via the signal and track circuits or from the speed control generator.

Since the brake pipe extending from car to car through the train is supplied with fluid under pressure by the brake valve relay valve device on the locomotive and must flow from the locomotive back through the train to the last car, it is apparent that, while effecting charging of the brake pipe, the pressure in the brake pipe on those cars adjacent the locomotive is higher than in that portion of the brake pipe extending through the last several cars in the train, or in other words, a brake pipe gradient extends from the locomotive to the last car in the train.

Accordingly, if, while fluid under pressure is flowing from the brake valve relay valve device through the train brake pipe toward the last car in the train, the brake control center receives an impulse to cause a minimum brake application and operates in response to this impulse to correspondingly effect a reduction in equalizing reservoir pressure acting on one side of the movable abutment of the brake valve relay valve device, this reduction is ineffective to establish a differential of pressure on this abutment to cause it to operate the exhaust valve of the relay valve device to release fluid under pressure from the brake pipe to atmosphere since the brake pipe pressure acting on the opposite side of this movable abutment is rapidly reducing by the flow of fluid under pressure from the brake valve relay valve device through the train brake pipe toward the last car in the train as the result of the brake pipe gradient present at this time because the brake pipe was not fully charged at the instant the brake control center received the impulse to cause a minimum brake application.

Accordingly, it is the general purpose of this invention to provide an automated locomotive fluid pressure brake apparatus of the type described above with a novel and inexpensive means which will always assure the proper degree of reduction in brake pipe pressure to cause a minimum brake application upon the brake control center receiving an electrical impulse calling for a minimum brake application at a time when, subsequent to a brake application, the train brake pipe has not been fully charged to the pressure normally carried therein.

According to the present invention, a minimum reduction reservoir, into which fluid under pressure from the equalizing reservoir flows via the brake control center when this control center receives an impulse to cause a minimum brake application, is connected through a fluid pressure operated cut-off valve device, which is operated to a cut-off position when fluid under pressure supplied thereto reaches a chosen value, to one end of a double check valve device. The opposite end of this double check valve is connected to a brake pipe exhaust port of the brake valve relay valve device and its side outlet is open to atmosphere through a choke, the size of which is such as to provide for a brake pipe reduction at a service rate upon the supply of fluid under pressure therethrough via the brake pipe exhaust port of the brake valve relay valve device upon operation of this relay valve device to vent fluid under pressure from the brake pipe to atmosphere to effect a brake application. Therefore, fluid under pressure vented from the equalizing reservoir to the minimum reduction reservoir flows through the fluid pressure operated cut-off valve device to the double check valve to move it to a position to open a communication between the minimum reduction reservoir and atmosphere via this double check valve. Consequently, fluid under pressure flowing from the equalizing reservoir to the minimum reduction reservoir will now flow to atmosphere via the fluid pressure operated cut-off valve device and the double check valve. When equalizing reservoir pressure acting on the one side of the movable abutment of the brake valve relay valve device is thus reduced below the decreasing brake pipe pressure acting on the opposite side, resulting from the brake pipe gradient, brake pipe pressure is effective to move the movable abutment in the direction to unseat the exhaust valve of this relay valve device. When the exhaust valve is thus unseated, fluid under pressure will flow from the brake pipe to the above-mentioned opposite end of the double check valve, and when the pressure thus supplied to this opposite end exceeds the pressure supplied to the other end from the minimum reduction reservoir, the check valve will move to a position to open a communication between the opposite end and atmosphere through which fluid under pressure flowing from the brake pipe past the now open exhaust valve of the brake valve relay valve device will flow to atmosphere. Therefore, it is apparent that whichever pressure, exhausting brake pipe pressure or minimum reduction reservoir pressure, is the higher will be vented to atmosphere through the double check valve. Accordingly, it is apparent that as the exhausting brake pipe pressure and the minimum reservoir pressure increases in value, they are alternatively vented to atmosphere until the minimum reduction reservoir pressure increases to the hereinbefore-mentioned chosen pressure which is effective to operate the fluid pressure operated cut-off valve device to cut off the flow of fluid under pressure therethrough from the minimum reduction reservoir to the one end of the double check valve. When flow of fluid under pressure from the minimum reduction reservoir to the one end of the double check valve and thence to atmosphere is thus cut off, the equalizing reservoir pressure will thereafter equalize into the minimum reduction reservoir. Subsequent to this cutting off of flow of fluid under pressure from the minimum reduction reservoir to atmosphere via the double check valve, the exhausting brake pipe pressure will be vented to atmosphere via the double check valve until brake pipe pressure is reduced to a value slightly less than the pressure present in the equalizing reservoir and on the one side of the movable abutment of the brake valve relay valve device after equalization of equalizing reservoir pressure into the minimum reduction reservoir. Therefore, it is apparent that the amount of reduction in brake pipe pressure effected by the above-described operation of the brake valve relay valve device increases as the brake pipe gradient increases.

Figure 1A:
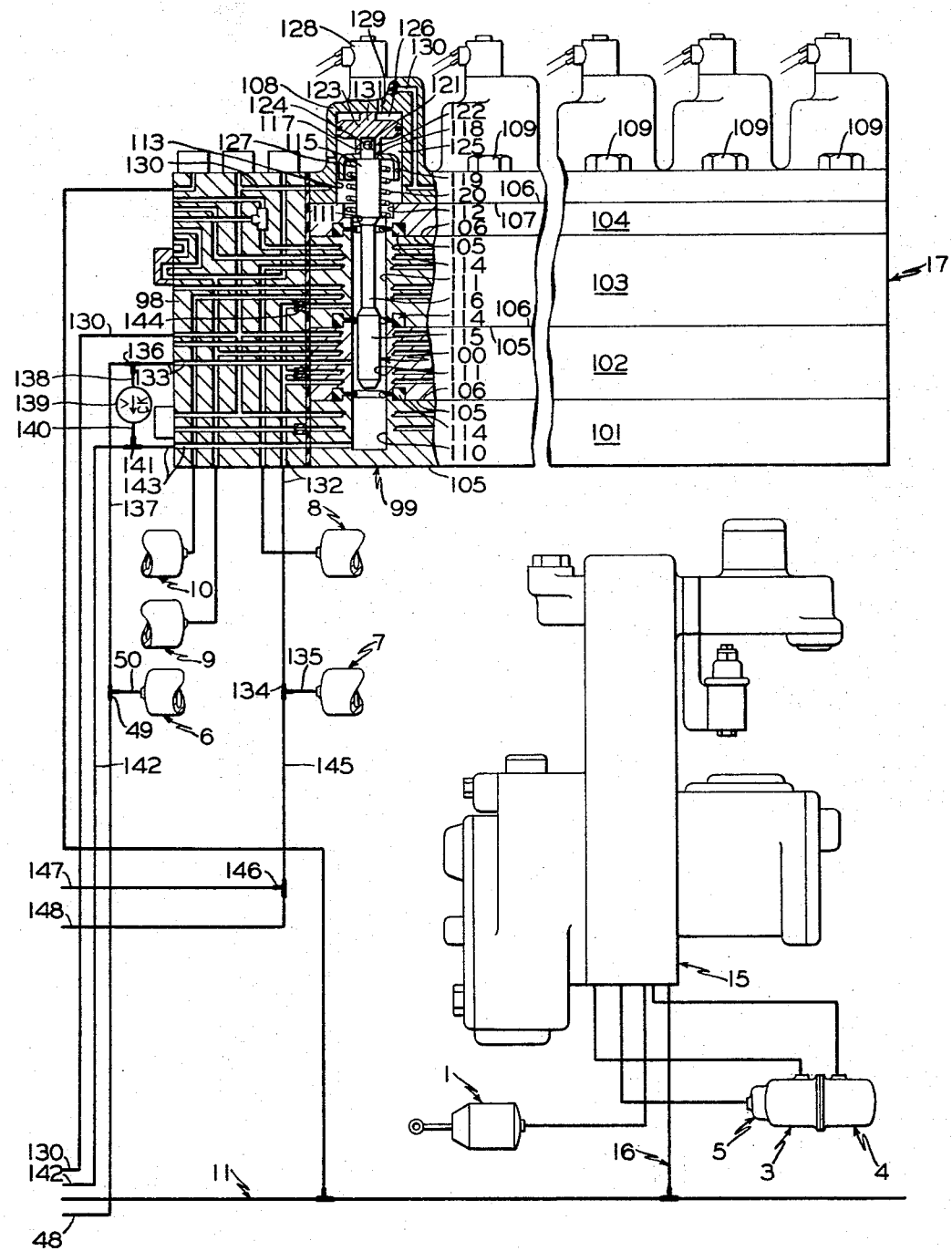

In the accompanying drawings:

FIG. 1 and FIG. 1A, when taken together such that the right-hand edge of FIG. 1 is matched with the left-hand edge of FIG. 1A, constitute a diagrammatic view of an automated locomotive fluid pressure brake apparatus embodying the invention.

DESCRIPTION

Referring to FIGS. 1 and 1A of the drawings, the automated locomotive fluid pressure brake apparatus for use on a diesel or diesel-electric type of railway locomotive comprises a brake cylinder device 1, a plurality of reservoirs including a main reservoir 2, an auxiliary reservoir 3 which is combined with an emergency reservoir 4 and a displacement volume reservoir 5 into a three-compartment reservoir, an equalizing reservoir 6, a minimum reduction reservoir 7, a supplementary reservoir 8, a stabilizing reservoir 9, a full service reduction reservoir 10, a brake pipe 11 that extends from end to end of the locomotive, an engineer's brake valve device 12, a cut-off valve device 13 through which the supply of fluid under pressure from the minimum reduction reservoir 7 to one end of a double check valve device 14 is effected while the pressure in the minimum reduction reservoir is less than a chosen pressure, a fluid pressure brake control valve device 15 that is connected by a branch pipe 16 to the brake pipe 11, and an electro-pneumatic brake control center 17 for receiving electrical impulses derived from signal and track circuits and a speed control axle-mounted pulse generator which form no part of the present invention.

The engineer's brake valve device 12 is shown in FIG. 1 of the drawing and may be of the self-lapping type, such as that disclosed in United States Patent No. 2,958,561, issued November 1, 1960, to Harry C. May and assigned to the assignee of the present application, and, in view of this, it is deemed unnecesesary to shown and describe this device in detail. Briefly, however, the engineer's brake valve device 12 comprises a sectionalized casing containing a relay valve device 19, which is shown diagrammatically and on an enlarged scale in FIG. 1. As is shown in outline in FIG. 1, the sectionalized casing further comprises a self-lapping regulating or control valve device 20, a brake pipe cut-off valve device 21, a vent valve device 22, an emergency valve device 23, a suppression valve device 24, and a manually positionable selective valve device 25 for selectively conditioning the brake valve device 12 to operate the brake apparatus when the brake valve device 12 is located on the leading locomotive of a multi-unit locomotive, or to cut out control of brake pipe pressure by the brake valve device 12 when the locomotive is a trailing unit in multiple-unit locomotive operation, or for conducting a brake pipe leakage test.

The relay valve device 19 comprises a diaphragm 26 which is subject opposingly to fluid pressures in a chamber 27 and a chamber 28 and is adapted through the medium of a coaxially arranged operating stem 29, operatively connected to the diaphragm 26, to effect unseating of a disc-shaped exhaust valve 30 carried by an annular valve member 31, or to effect unseating of a disc-shaped supply valve 32 carried by a coaxially arranged annular valve member 33, according to whether the pressure in chamber 27 is less than or exceeds the pressure in chamber 28. The stem 29 is coaxially connected to the chamber 28 side of diaphragm 26 and projects centrally through valve member 31 and through a chamber 34 and is adapted to abut one side of supply valve 32. Springs 35 and 36 urge the respective annular valve members 31 and 33 toward each other for normally concurrently seating the exhaust valve 30 and the supply valve 32 on their respective annular valve seats 37 and 38. The exhaust valve 30 controls communication between the chamber 34 and a chamber 37a which is connected by a passageway and corresponding pipe 39 to the left-hand end of the hereinbefore-mentioned double check valve device 14. The supply valve 32 controls communication between a supply valve chamber 40 and the chamber 34. Supply valve chamber 40 is connected by a passageway and corresponding pipe 41 to one end of a pipe T 42 that has its side outlet connected by a pipe 43 to the main reservoir 2. The chamber 34 is connected by a passageway and corresponding pipe 44 to the side outlet of a pipe T 45 that is disposed in the brake pipe 11. The passageway 44 is connected by a passageway 46 having therein a choke 47 to the hereinbefore-mentioned chamber 28.

The chamber 27 at the left-hand side of the diaphragm 26 is connected by a passageway and corresponding pipe 48 to one end of a pipe T 49 (FIG. 1A), the side outlet of which is connected by a pipe 50 to the hereinbefore-mentioned equalizing reservoir 6. Consequently, the diaphragm 26 is subject opposingly to equalizing reservoir pressure in the chamber 27 and brake pipe pressure in the chamber 28.

The cut-off valve device 13 comprises a casing section 51 containing a diaphragm 52 clamped about its periphery between the casing section 51 and a cover 53, and defining with the cover, a control chamber 54. At the other side of the diaphragm 52 is a spring chamber 55 which is open to atmosphere through a passageway 56 formed in a bushing 57 that is press-fitted into a bore in the casing section 51. Contained in the chamber 55 is a diaphragm follower 58 which is biased into operative contact with the diaphragm 52 by a spring 59 interposed between the follower 58 and a hollow spring seat 60 that rests against a partition wall 61 of the chamber 55. Follower 58 has a stem 62 that extends through the hollow spring seat 60 and a central opening in the partition wall 61.

A chamber 63 is formed in the casing section 51 at the side of the partition wall 61 opposite the chamber 55 and contains a valve 64 that is linked by means of a forked connection 65 to the lower end of follower stem 62, as viewed in FIG. 1 of the drawings. The valve 64 is adapted to make seating contact with a valve seat 66 formed on the upper end of a cylindrical valve member 67 which is slidably mounted in a bore 68 formed in a casing section 69 which is secured to the casing section 51 by any suitable means (not shown). The bore 68 in the casing section 69 extends from the chamber 63 to a chamber 70 formed in another casing section 71 secured to the casing section 69 by any suitable means (not shown).

The valve member 67 mentioned above is provided with a through bore 72 and a coaxial counterbore 73 encircled at its upper end by the valve seat 66. Valve member 67 is encircled at its lower end by a conical or poppet-type valve 74, which valve is arranged for co-operation with an annular valve seat 75 formed on the casing section 69 at the lower end of bore 68, to control communication between chamber 70 and a chamber 76 defined by the wall of the bore 66 and a reduced portion of the valve member 67. A spring 77 is disposed in chamber 70 and is interposed between the valve 74 and the casing section 71 for urging the valve member 67 upward to a position in which communication between chambers 63 and 70 is open via bore 72 and counterbore 73, and communication between chamber 70 and chamber 76 is closed, as shown in FIG. 1 of the drawings.

The casing section 51 is provided with a vertical bolting face 78 whereby the cut-off valve device 13 can be secured to a pipe bracket 79 by any suitable means such as cap screws (not shown). The pipe bracket 79 can be secured to any suitable part of a locomotive.

The double check valve device 14 comprises a body 80 cylindrical in shape and having formed integral therewith a boss 81. The body 80 is provided with a bore 82. The left-hand end of the bore 82 opens into a coaxial screw-threaded counterbore 83 to which the hereinbefore-mentioned pipe 39 is connected. The body 80 has extending inward from the right-hand end thereof a second counterbore 84 which is coaxial with the bore 82. A first annular valve seat 85 is formed on the body 80 at the left-hand end of the counterbore 84. Extending inward from the right-hand end of the body 80 and coaxial with the counterbore 84 is a third counterbore 84a in which is received a cylindrical portion 86 of a check valve end member 87 which is secured to the body 80 by any suitable means (not shown). The cylindrical portion 86 of the check valve end member 87 has formed thereon an annular valve seat 88 and a peripheral annular groove in which is disposed an O-ring 89 that forms a seal with the wall surface of counterbore 84a. Check valve end member 87 is also provided with a bore 90 having at one end the annular valve seat 88 and at the opposite end a screw-threaded coaxial counterbore 91 into which is received one end of a pipe 92. The opposite end of pipe 92 is connected to a corresponding passageway extending through the casing section 51, 69 and 71 of the cut-off valve device 13 to the chamber 70 therein.

The boss 81 formed on the body 80 is provided with a screw-threaded bore 93 which opens into the counterbore 84, the axis of the bore 93 forming a right angle with the axis of the counterbore 84. Received in the screw-threaded bore 93 is a screw-threaded plug 94 having extended therethrough a bore 95 of small diameter which constitutes a choked passageway through which fluid under pressure may flow from the interior of the counterbore 84 to the atmosphere.

Slidably mounted in the counterbore 84 is a check valve 96, the opposite ends of which are respectively adapted to contact the annular valve seats 85 and 88 accordingly as the check valve 96 is moved to one or the other end of the counterbore 84. The check valve 96 is provided with two spaced-apart peripheral annular grooves in each of which is disposed an O-ring 97 which forms a seal with the respective annular valve seats 85 and 88 accordingly as the check valve 96 is moved to the left-hand end or the right-hand end of the counterbore 84 by fluid under pressure supplied to one end or to the other end of the check valve 96.

An outline view of the brake control valve device 15 is shown in FIG. 1A of the drawings. Briefly, the brake control valve device 15 operates in response to a reduction in pressure in the brake pipe 11 at a service rate to effect the supply of fluid under pressure from the auxiliary reservoir 3 to the brake cylinder device 1 to cause a service brake application, to a reduction in pressure in the brake pipe 11 at an emergency rate to effect the supply of fluid under pressure from both the auxiliary reservoir 3 and the emergency reservoir 4 to the brake cylinder device 1 to cause an emergency brake application in which the pressure in the brake cylinder device 1 is higher than that obtained therein when a service brake application is effected, and to an increase in the pressure in the brake pipe 11 to effect a brake release.

The electro-pneumatic brake control center 17 comprises a pipe bracket 98 to which all pipe connections are made and a sectionalized casing 99 having therein a plurality of solenoid-operated spool-type valves, only one of which is pertinent to the present invention, it being shown in FIG. 1A of the drawings and indicated by the reference numeral 100. The sectionalized casing 99 comprises a plurality of casing sections 101, 102, 103 and 104 each having oppositely arranged plane surfaces 105 and 106, the surface 106 on the casing sections 101, 102 and 103 abutting, respectively, the surface 105 on the casing sections 102, 103 and 104, and the surface 106 on the casing section 104 abutting a corresponding surface 107 formed on the bottom of a cover member 108 which is secured to the casing sections 101, 102, 103 and 104, which are arranged in a stack, by a plurality of cap screws 109 that extend through coaxial smooth bores (not shown) in the cover member 108 and casing sections 104, 103 and 102, and have screw-threaded engagement with coaxial screw-threaded bores (not shown) in the casing section 101.

The casing section 101 is provided with a plurality of spaced-apart parallel counterbores 110 corresponding in number to the number of spool-type valves embodied in the electro-pneumatic brake control center 17, only one of the counterbores 110 appearing in FIG. 1A of the drawings. Each of the casing sections 102, 103 and 104 is provided with a plurality of spaced-apart parallel bores 111 each coaxial with a corresponding counterbore 110 in the casing section 101. The casing section 104 is further provided with a plurality of counterbores 112 each of which is coaxial with a corresponding bore 111 in this casing section and extending inward from the plane surface 106 thereof.

The cover member 108 has extending inward or upward from the plane surface 107 thereon a plurality of counterbores 113 each of which is coaxial with a corresponding counterbore 112 that extends downward from the plane surface 106 on the upper side of the casing section 104.

Disposed between each pair of casing sections 101 and 102, 102 and 103, 103 and 104 is an annular sealing member 114, the inner edge of which is adapted to form a seal with one of two spaced-apart land portions 115 formed on the spool-type valve 100 and connected by a portion 116 of reduced diameter.

The upper end of the spool-type valve 100 is provided with a second portion 117 of reduced diameter which cooperates with the upper land portion 115 to form a shoulder 118 against which rests an annular cup-shaped spring seat 119 between which and the bottom of the corresponding counterbore 112, and in surrounding relation to the upper land portion 115, is interposed a spring 120. The second portion 117 of reduced diameter at the upper end of the spool-type valve 100 extends into a counterbore 121 formed in a boss 122 that is integral with a piston 123 that is slidably mounted in a corresponding one of the counterbores 113 formed in the cover member 108 and is connected to the piston 123 as, for example, by a pin 124 that extends through a bore in the second portion 117 of reduced diameter and has its opposite ends anchored in the boss 122.

The piston 123 cooperates with the cover member 108 to form on the respective opposite sides of the piston 123 two chambers 125 and 126. The chamber 125 is open to atmosphere via a port 127 in the cover member 108 and fluid under pressure may be supplied to the chamber 126 by means of a solenoid-operated valve device 128 which is adapted to control communication between a passageway 129 opening into the chamber 126 and a passageway 130 which is connected by a pipe bearing the same numeral to the lower or other end of the hereinafter-mentioned pipe tee 42 (FIG. 1), the side outlet of which is connected by the pipe 43 to the main reservoir 2.

In the absence of fluid under pressure in the chamber 126, the spring 120 is effective to bias the piston 123 and the spool-type valve 100 to the position shown in FIG. 1A of the drawings, in which position a boss 131 formed integral with the piston 123 on the upper face thereof abuts the upper end of the counterbore 113. In this position of the spool-type valve 100, the lower land portion 115 thereof is disposed above the lower annular sealing member 114 and in a position in which the inner edge of the intermediate one of the three annular sealing members 114 forms a seal with this lower land portion 115 to close communication between a first passageway 132 extending through the pipe bracket 98 and casing section 103 and opening at one end at the wall surface of the bore 111 in the casing section 103, and a second passageway 133 extending through the pipe bracket 98 and casing section 102 and opening at one end at the wall surface of the bore 111 in the casing section 102. The passageway 132 is connected by a corresponding pipe to the upper end of a pipe T 134, the side outlet of which is connected by a short pipe 135 to the hereinbefore-mentioned minimum reduction reservoir 7. The passageway 133 is connected by a corresponding pipe to one end of a pipe T 136, the opposite end of which is connected by a pipe 137 to the upper end of the hereinbefore-mentioned pipe T 49. The side outlet of the pipe T 136 is connected by a short pipe 138 to the inlet of a check valve device 139, the outlet of which is connected by a short pipe 140 to the side outlet of a pipe T 141. One end of the pipe T 141 is connected by a pipe 142 and a corresponding passageway to the delivery chamber (not shown) of the control valve 20 of the engineer's brake valve device 12 (FIG. 1), and the other end of the pipe T 141 is connected by a pipe 143 to a corresponding passageway extending through the pipe bracket 98 and casing section 101 and opening at the wall surface of the counterbore 110 in the casing section 101.

Since the lower land portion 115 of the spool-type valve 100 is disposed above the lower annular sealing member 114, as hereinbefore stated, it is apparent a communication is now established between the passageways 143 and 133. Consequently, the control valve device 20 of the engineer's brake valve device 12 is effective to effect the supply of fluid under pressure from the main reservoir 2 to the equalizing reservoir 6 via pipe 43, pipe T 42, pipe and passageway 41, control valve device 20, passageway and corresponding pipe 142, pipe T 141, pipe and passageway 143, counterbore 110 in casing section 101, bore 111 in the casing section 102, passageway and pipe 133, pipe T 136, pipe 137, pipe T 49, and pipe 50 to effect charging of this reservoir.

While the spool-type valve 100 occupies the position in which it is shown in FIG. 1A of the drawings, the upper land portion 115 thereon is disposed above the upper sealing gasket 114 that is interposed between the casing sections 103 and 104. Therefore, while the spool-type valve 100 occupies the position shown in FIG. 1A, the minimum reduction reservoir 7 is open to atmosphere via pipe 135, pipe T 134, pipe and passageway 132, having therein a choke 144 the size of which is less than the size of the bore 95 in the plug 94 (FIG. 1), bore 111 in the casing sections 103 and 104, counterbore 112 in the casing section 104, counterbore 113 in cover member 108 and port 127 in this cover member.

The lower end of the hereinbefore-mentioned pipe T 134 (FIG. 1A) is connected by a pipe 145 to the upper end of a pipe T 146, the side outlet of which is connected by a pipe 147 (FIGS. 1 and 1A) and corresponding passageway to the chamber 54 (FIG. 1) above the diaphragm 52 of the cut-off valve device 13. The lower end of pipe T 146 is connected by a pipe 148 and corresponding passageway to the chamber 63 in the cut-off valve device 13. Therefore, the chambers 54 and 63 are open to atmosphere while the spool-type valve 100 occupies the position shown in FIG. 1A.

OPERATION

Assume initially that the automated locomotive fluid pressure brake apparatus, shown in FIGS. 1 and 1A, is the equipment on a locomotive that is hauling a freight train; that the apparatus is void of fluid under pressure; that a handle 149 of the engineer's brake valve device 12, shown in FIG. 1 of the drawings, is sealed in its "Release" position, and that the self-lapping regulating or control valve device 20 of this brake valve device 12 has been adjusted to supply fluid under pressure from the main reservoir passageway 41 to the passageway and pipe 142 at a pressure corresponding to a preselected normal charged value determined by the setting of an adjusting screw 150 of the self-lapping regulating device 20. The pipe 142 is connected to the left-hand end of the pipe T 141 (FIG. 1A), to the right-hand end of which is connected one end of the pipe 143. The opposite end of the pipe 143 is connected to the corresponding passageway extending through the pipe bracket 98 and casing section 101 and opening at the wall surface of the counterbore 110 in this casing section. While the spool-type valve 100 occupies the position shown in FIG. 1A, a communication is open between the counterbore 110 and the bore 111 in the casing section 102. One end of the passageway 133, extending through the pipe bracket 98 and casing section 102, opens at the wall surface of the bore 111 in the casing section 102, and the opposite end of this passageway is connected by the pipe bearing the same numeral to the right-hand end of the pipe T 136. The left-hand end of pipe T 136 is connected by the pipe 137, to the upper end of pipe T 49 that has its side outlet connected by the pipe 50 to the equalizing reservoir 6.

INITIAL CHARGING

To initially charge the brake apparatus, the diesel engines are started by a maintenance man for operating fluid compressors (not shown) to effect charging of the main reservoir 2.

As has been assumed, the handle 149 of the engineer's brake valve device 12, shown in FIG. 1 of the drawings, is sealed in its "Release" poition. Therefore, while the handle 149 is in its "Release" position, the self-lapping regulating valve device 20 of this engineer's brake valve device 12 will effect the supply of fluid under pressure from the passageway and pipe 41, which, as shown in FIG. 1, is connected via pipe T 42 and pipe 43 to the main reservoir 2, to the passageway and pipe 142, which, as shown in FIG. 1A, is connected to the left-hand end of pipe T 141. The fluid under pressure thus supplied to the left-hand end of pipe T 141 will flow therethrough to the pipe and corresponding passageway 143 and thence to the equalizing reservoir 6 via counterbore 110, bore 111, passageway and corresponding pipe 133, pipe T 136, pipe 137, pipe T 49 and pipe 50. The fluid under pressure thus supplied to the equalizing reservoir 6 will therefore charge it to a pressure corresponding to the pressure for which the self-lapping regulating valve device 20 of the engineer's brake valve device 12 has been adjusted.

As shown in FIG. 1A, the lower end of pipe T 49 is connected by the pipe and corresponding passageway 48 to the chamber 27 (FIG. 1) at the left-hand side of the diaphragm 26 of the relay valve device 19 of the engineer's brake valve device 12. Therefore, fluid under pressure supplied to the equalizing reservoir 6, in the manner described above, also flows to the chamber 27 and deflects the diaphragm 26 in the direction of the right hand to effect unseating of supply valve 32, whereupon fluid under pressure present in the chamber 40 will flow therefrom past the supply valve 32 to the passageway 44 and thence through the brake pipe cut-off valve device 21, in the manner described in detail in the hereinbefore-mentioned patent, and the remaining portion of the passageway 44 to the pipe bearing the same numeral, which pipe 44 is connected to the side outlet of the pipe T 45 disposed in the brake pipe 11. Therefore, the fluid under pressure that is supplied by the relay valve device 19 of the engineer's brake valve device 12, shown in FIG. 1 of the drawings, flows to the brake pipe 11 to charge the brake pipe 11, the train brake pipe and the brake equipments on cars in the train to a pressure corresponding to the pressure for which the self-lapping regulating valve device 20 of this brake valve device has been adjusted.

The brake control valve device 15 (FIG. 1A) on the locomotive will respond to the charging of the brake pipe 11 by the relay valve device 19 of the engineer's brake valve device 12, shown in FIG. 1 of the drawings, to connect the brake cylinder device 1 to atmosphere and to charge the auxiliary reservoir 3 and the emergency reservoir 4 to the pressure carried in the brake pipe 11.

MINIMUM SERVICE BRAKE APPLICATION

When the electro-pneumatic brake control center 17 (FIG. 1A) receives an electrical impulse, derived from a signal circuit or a track circuit, or from the speed control axle-mounted pulse generator in response to the speed of the train exceeding the speed limit for the zone in which the train is traveling, to effect a minimum brake application, the solenoid-operated valve device 128 will become energized. When the solenoid-operated valve device 128 is thus energized, it operates to establish a communication between the passageways 129 and 130. Since the passageway 130 is connected to the main reservoir 2 via the corresponding pipe 130, pipe T 42 and pipe 43, fluid under pressure will flow from the main reservoir 2 to the passageway 129 and thence to the chamber 126 above the piston 123. Fluid under pressure thus supplied to the chamber 126 is effective to move the piston 123 and the spool-type valve 100 downwardly against the yielding resistance of the spring 120 until the cup-shaped annular spring seat 119 abuts the plane flat surface 106 on the upper side of casing section 104. In this position of the spool-type valve 100, the inner peripheral surface of the lower annular sealing member 114 disposed between the casing sections 101 and 102 makes a seal with the peripheral surface of the lower land portion 115 of the spool-type valve 100, the inner peripheral surface of the upper annular sealing member 114 disposed between the casing sections 103 and 104 makes a seal with the peripheral surface of the upper land portion 115 of the spool-type valve 100, and substantial clearance exists between the inner peripheral surface of the intermediate annular sealing member 114 disposed between the casing sections 102 and 103 and the peripheral surface of the reduced portion 116 of the spool-type valve 100. The seal formed at the lower land portion 115 of the spool-type valve 100 closes communication between the passageways 143 and 133. Since the passageway 143 is connected by the pipe bearing the same numeral to one end of the pipe T 141, the opposite end of which is connected to the self-lapping regulating valve device 20 of the engineer's brake valve device 12 via the pipe and corresponding passageway 142, fluid under pressure can no longer be supplied from the regulating valve device 20 to the equalizing reservoir 6.

Furthermore, the seal formed at the upper land portion 115 of the spool-type valve 100 closes communication between the passageway 132, which is connected by the corresponding pipe to the minimum reduction reservoir 7, and atmosphere.

Therefore, since substantial clearance exists between the inner peripheral surface of the intermediate annular sealing member 114 and the peripheral surface of the reduced portion 116 of the spool-type valve 100, fluid under pressure will now flow from the equalizing reservoir 6 to the minimum reduction reservoir 7 via pipe 50, pipe T 49, pipe 137, pipe T 136, pipe and corresponding passageway 133, the bore 111 in the casing section 102, the clearance between the inner peripheral surface of the intermediate annular sealing member 114 and the peripheral surface of the reduced portion 116 of the spool-type valve 110, the bore 111 in the casing section 103, the passageway and corresponding pipe 132 having therein the choke 14, pipe T 134, and pipe 135.

The minimum reduction reservoir 7 (FIG. 1A) is connected to the right-hand end of the double check valve device 14 (FIG. 1) via pipe 135, pipe T 134, pipe 145, pipe T 146, pipe and corresponding passageway 148 (FIG. 1), chamber 63 in the cut-off valve device 13, counterbore 73 and bore 72 in the cylindrical valve member 67, chamber 70, and passageway and corresponding pipe 92. Therefore, fluid under pressure supplied from the equalizing reservoir 6 to the minimum reduction reservoir 7 will also flow to the right-hand end of the double check valve device 14 and move the check valve 96 to the position shown in FIG. 1, if this check valve is not already in this position. While the check valve 96 is in the position shown in FIG. 1, the pipe 92 is open to atmosphere via bore 90, past annular valve seat 88, counterbore 84, and bore 95 in the plug 94. Consequently, fluid under pressure flowing from the equalizing reservoir 6 to the minimum reduction reservoir 7 will also flow to atmosphere.

It will be noted that the chamber 27 (FIG. 1) at the left-hand side of the diaphragm 26 of the relay valve device 19 of the engineer's brake valve device 12 is connected to the equalizing reservoir 6 via pipe and corresponding passageway 48, pipe T 49 and pipe 50. Therefore, fluid under pressure will also flow from the chamber 27 to the minimum reduction reservoir 7 and atmosphere so that the pressure in the chamber 27 is reduced simultaneously as the pressure in the equalizing reservoir 6 is reduced.

As the pressure in the chamber 27 is reduced by flow therefrom to the minimum reduction reservoir 7 and to atmosphere, as just explained, brake pipe pressure present in the chamber 28 at the right-hand side of the diaphragm 26 of the relay valve device 19 of the engineer's brake valve device 12 is rendered effective to deflect the diaphragm 26 in the direction of the left hand to, through the intermediary of the stem 29 and a collar 151 formed thereon, effect unseating of the exhaust valve 30 from the annular exhaust valve seat 37. When the exhaust valve 30 is thus unseated, fluid under pressure will flow from the brake pipe 11 to the left-hand end of the double check valve device 14 via the side outlet of pipe T 45, pipe and passageway 44, chamber 34, past unseated exhaust valve 30, chamber 37a, and passageway and corresponding pipe 39. Since there is no choke between the brake pipe 11 and the left-hand end of the double check valve device 14, whereas fluid under pressure flowing from the chamber 27 of the relay valve device 19 of the engineer's brake valve device 12 and from the equalizing reservoir 6 to the minimum reduction reservoir 7 and to the right-hand end of the double check valve device 14 via the cut-off valve device 13 must flow through the choke 144 carried by the pipe bracket 98 and disposed in the passageway 132, it is apparent that pressure in the pipe 39, which is connected to the left-hand end of double check valve device 14, will build up faster than the pressure in the pipe 92, which is connected to the right-hand end of this double check valve device. Consequently, when the pressure in the pipe 39 and acting on the left-hand end of the check valve 96 exceeds the pressure in the pipe 92 and acting on the right-hand end of the check valve 96 by, for example, one pound per square inch, the check valve 96 will be moved from the position shown in FIG. 1 in the direction of the right hand until the right-hand end of this check valve 96 contacts the annular valve seat 88 to cut off flow of fluid under pressure from the pipe 92 to atmosphere via the more 95 in the plug 94. Upon movement of the check valve 96 to its right-hand position, the pipe 39 is open to atmosphere via the bore 95 in the plug 94. Therefore, fluid under pressure will flow from the brake pipe 11 and from the chamber 28, which is connected to the passageway 44 via the choke 47 and passageway 46, to atmosphere.

Since the communication between the minium reduction reservoir 7 and atmosphere is now closed, the pressure in the minimum reduction reservoir 7 and the pipe 92 will increase as a result of the flow of fluid under pressure from the equalizing reservoir 6 and the chamber 27 to the minimum reduction reservoir 7. Therefore, this increase in pressure in the pipe 92 is effective on the right-hand end of the check valve 96 to move it in the direction of the left hand out of contact with the annular valve seat 88 and to the position shown in FIG. 1, in which the left-hand end of this check valve 96 is in seating contact with the annular valve seat 85, thereby closing communication between the pipe 39 and atmosphere. While the check valve 96 occupies the position in which it is shown in FIG. 1, fluid under pressure in the pipe 92 will be vented to the bore 95 in the plug 94.

However, since the check valve 96 now closes communication between the pipe 39 and atmosphere, the pressure in the pipe 39 will increase as the result of the fluid under pressure supplied thereto from the train brake pipe past the now open exhaust valve 30 of the relay valve device 19. Consequently, when the pressure acting on the left-hand end of the check valve 96 exceeds the pressure acting on the right-hand end thereof, the higher pressure acting on the left-hand end will move this check valve 96 from the position in which it is shown in FIG. 1 in the direction of the right hand until the right-hand end of the check valve again contacts the annular valve seat 88 to close communication between the pipe 92 and atmosphere.

From the foregoing, it is apparent that the check valve 96 shuttles back and forth, or cycles, to vent fluid under pressure from whichever one of the pipes 39 or 92 that is at the higher pressure. This cycling of the check valve 96 will continue until the pressure supplied from the equalizing reservoir 6 and chamber 27 at the left-hand side of the diaphragm 26 of the relay valve device 19 to the minimum reduction reservoir 7 and the chamber 54 of the cut-off valve device 13 increases to a value of, for example, ten pounds per square inch. Upon the pressure in the chamber 54 reaching ten pounds per square inch, this pressure is effective to deflect the diaphragm 52 downward against the yielding resistance of the spring 59. This downward deflection of the diaphragm 52 is effective, through the intermediary of the stem 62, to first move the valve 64 into seating contact with the annular valve seat 66, thereby closing communication between the chambers 63 and 70, and thereafter to move the cylindrical valve member 67 downward so that the valve 74 is moved out of seating contact with the annular valve seat 75, whereupon the pipe 92 is vented to atmosphere past the unseated valve 74.

When the valve 64 is moved into seating contact with the annular valve seat 66, communication is closed between the pipe 92 and the minimum reduction reservoir 7. Consequently, the fluid under pressure flowing from the equalizing reservoir 6 and the chamber 27 can no longer flow to the pipe 92 so that the pressure therein can increase to a value above the pressure in the pipe 39. Therefore, fluid under pressure supplied from the train brake pipe past the open exhaust valve 30 of the relay valve device 19 to the pipe 39, subsequent to closing the communication between the minimum reduction reservoir 7 and the pipe 92, is effective to move the check valve 96 into seating contact with the annular valve seat 88 and maintain it in this position so long as fluid under pressure continues to flow from the train brake pipe to the pipe 39.

Subsequent to operation of the cut-off valve device 13 to effect the seating of the valve 64 on the annular valve seat 66 to close communication between the minimum reduction reservoir 7 and the pipe 92, fluid under pressure will continue to flow from the equalizing reservoir 6 and chamber 27 into the minimum reduction reservoir 7 until the pressures in the equalizing reservoir 6 and the minimum reduction reservoir 7 are equalized.

After the pressures in equalizing reservoir 6 and the minimum reduction reservoir 7 have equalized, there will be no further reduction of pressure in the chamber 27 at the left-hand side of the diaphragm 26 of the relay valve device 19. However, fluid under pressure will continue to flow from the chamber 28 at the right-hand side of the diaphragm 26 to atmosphere via choke 47, passageways 46 and 44, chamber 34, past the unseated exhaust valve 30, chamber 37a, passageway and corresponding pipe 39, bore 82 and counterbore 84 in the body 80 of double check valve device 14, and bore 95 in the plug 94 carried by the boss 81 which is integral with the body 80.

When brake pipe pressure present in the chamber 28 at the right-hand side of the diaphragm 26 of the relay valve device 19 of the engineer's brake valve device 12 has reduced by flow to atmosphere via the double check valve device 14, in the manner just explained, to a value slightly less than the reduced equalizing reservoir pressure present in the chamber 27 at the left-hand side of the diaphragm 26, the higher pressure present in the chamber 27 will deflect the diaphragm 26 in the direction of the right hand to, through the intermediary of the stem 29, render the spring 35 effective to move the exhaust valve 30 into seating contact with the annular valve seat 37, thereby closing communication between the chambers 34 and 37a and cutting off flow of fluid under pressure from the brake pipe 11 and the train brake pipe to atmosphere via the double check valve device 14. It will be understood that the amount of reduction of pressure in the brake pipe 11 and the train brake pipe effected, as just described, will cause a minimum brake application on the cars in the train.

RELEASE OF A MINIMUM SERVICE BRAKE APPLICATION

When the electrical impulse derived from a signal circuit or a track circuit or from the axle-mounted pulse generator to effect a minimum brake application ceases or is cut off, the solenoid-operated valve device 128 (FIG. 1A) will be deenergized. When the solenoid-operated valve device 128 is thus deenergized, it operates to close communication between the passageways 129 and 130 and establish a communication between the passageways 129 and atmosphere through which the fluid under pressure previously supplied to the chamber 126 is vented. As fluid under pressure is thus vented from the chamber 126 above the piston 123, the spring 120 is rendered effective to move the piston 123 and the spool-type valve 100 upward to the position shown in FIG. 1A.

Upon the return of the spool-type valve 100 to the position shown in FIG. 1A, the minimum reduction reservoir 7 is connected to atmosphere and a communication is established between the passageways 143 and 133, as hereinbefore described in detail under "Initial Charging." When a communication is thus reestablished between the passageways 143 and 133, the self-lapping regulating valve device 20 of the engineer's brake valve device 12 will effect the supply of fluid under pressure from the main reservoir 2 to the equalizing reservoir 6, in the manner hereinbefore described in detail, to charge this reservoir and also the chamber 27 at the left-hand side of the diaphragm 26 of the relay valve device 19 of the brake valve device 12 to a pressure corresponding to the pressure for which the regulating valved device 20 has been adjusted.

Fluid under pressure thus supplied to the chamber 27 of the relay valve device 19 operates this valve device 19, in the manner hereinbefore described in detail, to supply fluid under pressure from the main reservoir 2 to the brake pipe 11 to charge the brake pipe 11, the train brake pipe, and the chamber 28 to a pressure corresponding to the pressure for which the self-lapping regulating valve device 20 has been adjusted.

The brake control valve device on each car in the train will respond to this charging of the brake pipe to effect a brake release on the corresponding car.

MINIMUM SERVICE BRAKE APPLICATIONS INITIATED PRIOR TO FULLY CHARGING TRAIN BRAKE PIPE

Let it be supposed that a brake application has been effected on the cars in a train. Let it be further supposed that, prior to the brake pipe extending from car to car through the train, becoming fully charged, in the manner hereinbefore explained in detail, to a pressure corresponding to the pressure for which the regulating valve device 20 of the engineer's brake valve device 12 has been adjusted, the electro-pneumatic brake control center 17 (FIG. 1A) receives an electrical impulse derived from a signal circuit or a track circuit, or from the speed control axle-mounted pulse generator to effect a minimum brake application.

Upon the electro-pneumatic brake control center 17 receiving this electrical impulse to effect a minimum brake application before the train brake pipe is fully charged, the solenoid-operated valve device 128 will become energized whereupon the piston 123 and spool-type valve 100 will be moved downwardly by the fluid under pressure supplied to the chamber 126, in the manner hereinbefore described, until the cup-shaped annular spring seat 119 abuts the plane flat surface 106 on the upper side of casing section 104. In this position of the spool-type valve 100, the minimum reduction reservoir 7 will be cut off from atmosphere via port 127 in the cover member 108, the communication between passageways 133 and 143 will be closed, and a communication will be established between the passageways 133 and 132, in the manner hereinbefore described.

Upon the establishment of the communication between the passageways 133 and 132, fluid under pressure will flow from the equalizing reservoir 6 and the chamber 27 at the left-hand side of the diaphragm 26 of the relay valve device 19 of the engineer's brake valve device 12 to the minimum reduction reservoir 7, and from the minimum reduction reservoir through the cut-off valve device 13 to the right-hand end of the double check valve device 14, as hereinbefore described in detail, in connection with effecting a minimum service brake application.

Since it was assumed that the electrical impulse for effecting this minimum brake application was received prior to the train brake pipe becoming fully charged, it will be understood that a brake pipe gradient extends from the locomotive to the last car in the train. Therefore, at the instant this electrical impulse is received, the supply valve 32 of the relay valve device 19 will be unseated to effect the supply of fluid under pressure from the main reservoir 2 to the chamber 34, and, due to the above-mentioned brake pipe gradient, fluid under pressure will be rapidly flowing from the chamber 34 and also the chamber 28 at the right-hand side of the diaphragm 26 toward the last car in the train via passageways 44 and 46, pipe 44, pipe T 45, brake pipe 11, and the brake pipe extending from car to car through the train.

At this time, fluid under pressure is flowing from the chamber 27 at the left-hand side of the diaphragm 26 to the minimum reduction reservoir 7 via the choke 144, in the manner hereinbefore explained, but since fluid under pressure is also rapidly flowing from the chamber 28 at the right-hand side of diaphragm 26 toward the last car in the train as a result of the brake pipe gradient, a preponderance of pressure in the chamber 28 over that in the chamber 27 will not be immediately established to deflect the diaphragm 26 in the direction of the left hand to effect unseating of the exhaust valve 30 from the annular valve seat 37 to cause flow of fluid under pressure from the brake pipe 11 to the right-hand end of the double check valve device 14. Consequently, while fluid under pressure is flowing from the chambers 34 and 28 toward the last car in the train as a result of the brake pipe gradient, fluid under pressure will continue to flow from the equalizing reservoir 6 and the chamber 54 of the cut-off valve device 13 via pipe 145, to the minimum reduction reservoir 7 and thence to the chamber 54 of the cut-off valve dvice 13 via pipe 145, pipe T 146, and pipe and corresponding passageway 147, and to atmosphere via pipe 145, pipe T 146, pipe and corresponding passageway 148, chamber 63, counterbore 73, bore 72, and chamber 70 in the cut-off valve device 13, passageway and corresponding pipe 92, bore 90 and counterbore 84 in the double check valve device 14, and the bore 95 in the plug 94.

As fluid under pressure flows from the main reservoir 2 past the unseated supply valve 32 to the chamber 34 and thence via the passageway and corresponding pipe 44, pipe T 45, brake pipe 11, and the train brake pipe toward the last car in the train, the pressure in the train brake pipe will increase, and as this pressure in the train brake pipe increases, the rate of flow of fluid under pressure from the chambers 34 and 28 toward the last car in the train will decrease. As fluid under pressure at this time is flowing from the chamber 27 to the minimum reduction reservoir 7 and atmosphere at a rate controlled by the size of the choke 144 and the bore 95 in the plug 94, as stated above, it will be apparent that, after a certain interval of time, the pressure in the chamber 28 will exceed the pressure in the chamber 27. Upon the pressure in the chamber 28 exceeding the still reducing pressure in the chamber 27, the diaphragm 26 will be deflected in the direction of the left hand to, through the intermediary of the stem 35 and collar 150 thereon, first render the main reservoir pressure present in the chamber 40 effective to seat the supply valve 32 on the annular valve seat 38, and thereafter effect unseating of the exhaust valve 30 from the annular valve seat 37. Upon the exhaust valve 30 thus being unseated, fluid under pressure will flow from the brake pipe 11 and train brake pipe connected thereto to the left-hand end of the double check valve device 14 via the side outlet of the pipe T 45, pipe and corresponding passageway 44, chamber 34, past unseated exhaust valve 30, chamber 37a and pipe 39. Since there is no choke between the brake pipe 11 and the left-hand end of the double check valve device 14, whereas, as hereinbefore stated, fluid under pressure flowing from the chamber 27 and the equalizing reservoir 6 to the right-hand end of the double check valve device 14 must flow through the choke 144, it is apparent that the pressure in the pipe 39 will build up faster than the pressure in pipe 92. Consequently, when the pressure in the pipe 39 and acting on the left-hand end of the check valve 96 exceeds the pressure in the pipe 92 and acting on the right-hand end of this check valve by, for example, one pound per square inch, the check valve 96 will move from the position shown in FIG. 1 to a position in which the right-hand end thereof is in seating contact with the annular valve seat 88. In this position of the check valve 96, communication between the pipe 92 and atmosphere is closed, and a communication between the pipe 39 and atmosphere is opened via the bore 95 in the plug 94. Fluid under pressure will now flow from the train brake pipe and chamber 28 to atmosphere. Since the communication between the minimum reduction reservoir 7 and atmosphere is now closed, the pressure in the minimum reduction reservoir 7 and the pipe 92 will increase as a reuslt of the flow of fluid under pressure from the equalizing reservoir 6 and the chamber 27 to the minimum reduction reservoir 7. Therefore, this increase in pressure in the pipe 92 is effective on the right-hand end of the check valve 96 to move it in the direction of the left hand out of contact with the annular valve seat 88, and to the position shown in FIG. 1 in which the left-hand end of this check valve 96 is in seating contact with the annular valve seat 85 thereby closing communication between the pipe 39 and atmosphere. While the check valve 96 occupies the position in which it is shown in FIG. 1, fluid under pressure in the pipe 92 will be vented to atmosphere via the bore 95 in the plug 94.

However, since the check valve 96 now closes communication between the pipe 39 and atmosphere, the pressure in the pipe 39 will increase as the result of the fluid under pressure supplied thereto from the train brake pipe past the now open exhaust valve 30 of the relay valve device 19. Consequently, when the pressure acting on the left-hand end of the check valve 96 exceeds the pressure acting on the right-hand end thereof, the higher pressure acting on the left-hand end will move this check valve 96 from the position in which it is shown in FIG. 1 in the direction of the right hand until the right-hand end of the check valve again contacts the annular valve seat 88 to close communication between the pipe 92 and atmosphere.

From the foregoing, it is apparent that the check valve 96 shuttles back and forth, or cycles, to vent fluid under pressure from whichever one of the pipes 39 or 92 that is at the higher pressure. This cycling of the check valve 96 will continue until the pressure supplied from the equalizing reservoir 6 and chamber 27 at the left-hand side of the diaphragm 26 of the relay valve device 19 to the minimum reduction reservoir 7 and the chamber 54 of the cut-off valve device 13 increase to a value of ten pounds per square inch. Upon the pressure in the chamber 54 reaching ten pounds per square inch, this pressure is effective to deflect the diaphragm 52 downward against the yielding resistance of the spring 59. This downward deflection of the diaphragm 52 is effective, through the intermediary of the stem 62, to first move the valve 64 into seating contact with the annular valve seat 66, thereby closing communication between the chambers 63 and 70, and thereafter to move the cylindrical valve member 67 downwardly so that the valve 74 is moved out of seating contact with the annular valve 75 whereupon the pipe 92 is vented to atmosphere past the unseated valve 74.

When the valve 64 is moved into seating contact with the annular valve seat 66, communication is closed between the pipe 92 and the minimum reduction reservoir 7. Consequently, the fluid under pressure flowing from the equalizing reservoir 6 and the chamber 27 can no longer flow to the pipe 92 so that the pressure therein can increase to a value above the pressure in the pipe 39. Therefore, fluid under pressure supplied from the train brake pipe past the open exhaust valve 30 of the relay valve device 19 to the pipe 39, subsequent to closing the communication between the minimum reduction reservoir 7 and the pipe 92, is effective to move the check valve 96 into seating contact with the annular valve seat 88 and maintain it in this position so long as fluid under pressure continues to flow from the train brake pipe to the pipe 39.

Subsequent to operation of the cut-off valve device 13 to effect the seating of the valve 64 on the annular valve seat 66 to close communication between the minimum reduction reservoir 7 and the pipe 92, fluid under pressure will continue to flow from the the equalizing reservoir 6 and chamber 27 into the minimum reduction reservoir 7 until the pressures in the equalizing reservoir 6 and the minimum reduction reservoir 7 are equalized.

After the pressures in equalizing reservoir 6 and the minimum reduction reservoir 7 have equalized, there will be no further reduction of pressure in the chamber 27 at the left-hand side of the diaphragm 26 of the relay valve device 19. However, fluid under pressure will continue to flow from the chamber 28 at the right-hand side of the diaphragm 26 to atmosphere via choke 47, passageways 46 and 44, chamber 34, past the unseated exhaust valve 30, chamber 37a, passageway and corresponding pipe 39, bore 82 and counterbore 84 in the body 80 of double check valve device 14, and bore 95 in the plug 94 carried by the boss 81 which is integral with the body 80.

As the pressure in the chamber 28 is reduced below the pressure in the chamber 27, in the manner just described, the higher pressure present in the chamber 27 is effective to deflect the diaphragm 26 in the direction of the right hand, whereupon the spring 35 is rendered effective to seat the exhaust valve 30 on the annular valve seat 37 thereby closing communication between the train brake pipe and atmosphere to prevent a further reduction in brake pipe pressure. The control valve device on each car in the train will operate in response to this reduction in the pressure in the brake pipe to cause a corresponding minimum brake application on each respective car.

From the foregoing, it is apparent that when the electro-pneumatic brake control center 17 receives an electrical impulse derived from a signal circuit or a track circuit, or from the speed control axle-mounted pulse generator to effect a minimum brake application at a time when the train brake pipe is not fully charged and a brake pipe gradient extends from the locomotive to the last car in the train, the apparatus of the present invention provides for venting to atmosphere the fluid under pressure supplied from the equalizing reservoir 6 to the minimum reduction reservoir 7 until the brake pipe gradient has been dissipated, and thereafter alternatively venting to atmosphere whichever pressure, exhausting brake pipe pressure or minimum reduction reservoir pressure, that is the higher until the pressure in the minimum reduction reservoir 7 reaches a chosen value, whereupon communication between the minimum reduction reservoir 7 and atmosphere is closed to subsequently cause an equalization of pressure between the equalizing reservoir 6 and minimum reduction reservoir 7, which reduction in equalizing reservoir pressure is effective to cause a minimum brake application on the cars in the train.

Having now described the invention, what I claim as new and desire to secure by Letters Patent, is:

1. In a fluid pressure brake system for a locomotive, the combination of:
 (a) a train brake pipe normally charged to a certain pressure,
 (b) an equalizing reservoir normally charged to said certain pressure,
 (c) a manually operated brake valve device comprising:
  (i) a fluid pressure operated relay valve means subject opposingly to the pressure in said equalizing reservoir and said train brake pipe for effecting the supply of fluid under pressure to and the release of fluid under pressure from said brake pipe in accordance with a corresponding increase and decrease in the pressure in said equalizing reservoir,
 (d) a minimum reduction reservoir,
 (e) an electro-responsive valve device operable in response to energization to establish a communication between said equalizing reservoir and said minimum reduction reservoir through which fluid under pressure flows from said equalizing reservoir and said fluid pressure operated relay valve device to said minimum reduction reservoir to cause said relay valve device to operate to release fluid under pressure from said brake pipe to cause a brake application,
 (f) a double check valve device,
 (g) a first conduit connecting one end of said double check valve device to said fluid pressure operated relay valve means, through which conduit flows fluid under pressure released from said brake pipe by operation of said relay valve means, (h) a second conduit connecting the opposite end of said double check valve device to said minimum reduction reservoir, and (i) a fluid pressure operated cut-off valve device disposed in said second conduit and operable to cut off flow of fluid under pressure therethrough upon the pressure in said minimum reduction reservoir reaching a chosen value, (j) said double check valve device being operable alternatively to release fluid under pressure from said first and second conduits accordingly as the pressure in one of said conduits predominates over that in the other until the pressure in said minimum reduction reservoir reaches said chosen value.

2. A fluid pressure brake system for a locomotive, as claimed in claim 1, further characterized in that said relay valve means is operative to release fluid under pressure from the brake pipe to said double check valve device only after the pressure gradient in the train brake pipe is dissipated.

3. A fluid pressure brake system for a locomotive, as claimed in claim 1, further characterized in that said double check valve device is provided with outlet port means for releasing fluid under pressure from said train brake pipe at a service rate when the pressure supplied thereto by the said relay valve means predominates.

4. A locomotive fluid pressure brake system, as claimed in claim 1, further characterized in that said fluid pressure operated cut-off valve device is operable upon the pressure in said minimum reduction reservoir reaching said chosen value to release to atmosphere fluid under pressure from that portion of said second conduit extending between said cut-off valve device and said opposite end of said double check valve device whereby said double check valve device is rendered effective hereafter to continuously release to atmosphere fluid under pressure vented from said train brake pipe by operation of said relay valve means.

5. A locomotive fluid pressure brake system, as claimed in claim 1, further characterized in that the capacity of said minimum reduction reservoir is such that upon equalization of pressures between said equalizing reservoir and said minimum reduction reservoir by flow of fluid under pressure from the former to the latter, the corresponding reduction in equalizing reservoir pressure causes said relay valve means to effect a sufficient reduction in train brake pipe pressure whereby a minimum service brake application occurs on each car in a train hauled by the locomotive.

6. A fluid pressure brake system for a locomotive, as claimed in claim 1, further characterized by flow restricting means for restricting the rate of flow of fluid under pressure from said equalizing reservoir to said minimum reduction reservoir.

7. In a fluid pressure brake system for a railway locomotive, the combination of:

(a) a main reservoir, (b) a train brake pipe normally charged to a certain pressure, (c) an equalizing reservoir normally charged to said certain pressure, (d) a manually operated brake valve device having a fluid pressure operated relay valve means subject opposingly to the pressure in said equalizing reservoir and said train brake pipe and operable in response to an increase in the pressure in said equalizing reservoir to effect the supply of fluid under pressure from said main reservoir to said train brake pipe and in response to a decrease in the pressure in said equalizing reservoir to effect a release of fluid under pressure from said train brake pipe to reduce the pressure therein a corresponding degree, (e) a minimum reduction reservoir, (f) an electro-responsive valve device operable in response to energization to establish a restricted communication between said equalizing reservoir and said minimum reduction reservoir through which fluid under pressure flows from said equalizing reservoir and said relay valve means to said minimum reduction reservoir to effect a reduction in pressure in said equalizing reservoir, (g) means operable to release fluid under pressure from said minimum reduction reservoir to atmosphere so long as a pressure gradient is present in said train brake pipe to prevent equalization of pressure between said equalizing reservoir and said minimum reduction reservoir, and (h) cut-off valve means operable upon the pressure in said minimum reduction reservoir increasing to a chosen value subsequent to dissipation of said brake pipe pressure gradient to close communication between said minimum reduction reservoir and atmosphere thereby to cause equalizaion of pressure between said equalizing reservoir and said minimum reduction reservoir.

8. In a fluid pressure brake system for a railway locomotive, the combination of:

(a) a main reservoir, (b) a train brake pipe normally charged to a certain pressure, (c) an equalizing reservoir normally charged to said certain pressure, (d) a manually operated brake valve device having a fluid pressure operated relay valve means subject opposingly to the pressure in said equalizing reservoir and said train brake pipe and operable in response to an increase in the pressure in said equalizing reservoir to effect the supply of fluid under pressure from said main reservoir to said train brake pipe and in response to a decrease in the pressure in said equalizing reservoir to effect a release of fluid under pressure from said train brake to reduce the pressure therein a corresponding degree, (e) a minimum reduction reservoir, (f) an electro-responsive valve device operable in response to energization to establish a communication between said equalizing reservoir and said minimum reduction reservoir through which fluid under pressure flows from said equalizing reservoir and said relay valve means to said minimum reduction reservoir to effect a reduction in pressure in said equalizing reservoir, (g) means operable to release fluid under pressure from said minimum reduction reservoir to atmosphere so long as a pressure gradient is present in said train brake pipe to prevent equalization of pressure between said equalizing reservoir and said minimum reduction reservoir, (h) said means being operable, subsequent to dissipation of said brake pipe gradient, in cycles to alternatively release to atmosphere fluid under pressure released from said train brake pipe by operation of said relay valve means and fluid under pressure supplied to said minimum reduction reservoir from said equalizing reservoir, and (i) a cut-off valve device operable upon the pressure in said minimum reduction reservoir increasing to a chosen value to cut off flow of fluid under pressure from said minimum reduction reservoir to atmosphere to thereafter cause equalization of pressures between said equalizing reservoir and said minimum reduction reservoir resulting in a further reduction in the pressure in said equalizing reservoir, (j) said relay valve means being operable in response to said reductions in pressure in said equalizing reservoir to effect a corresponding reduction in the pressure in said train brake pipe, which reduction is of a degree sufficient to cause a minimum brake application on the cars in a train hauled by the locomotive.

9. A locomotive fluid pressure brake apparatus comprising, in combination:
 (a) a main reservoir,
 (b) an equalizing reservoir normally charged to a chosen pressure,
 (c) a train brake pipe normally charged to said chosen pressure, reduction from which is effective to initiate a brake application on cars of a train hauled by the locomotive,
 (d) a relay valve device comprising:
   (i) supply valve means for effecting the supply of fluid under pressure from said main reservoir to said train brake pipe to cause the charging thereof to said chosen pressure,
   (ii) exhaust valve means for effecting the release of fluid under pressure from said train brake pipe to cause a reduction of pressure therein, and
   (iii) a movable abutment operatively connected to said valves and subject differentially on its opposite sides to pressure in said equalizing reservoir and said train brake pipe to effect a corresponding increase or a decrease in the pressure in said train brake pipe accordingly as the pressure in said equalizing reservoir is increased above the pressure in said train brake pipe or decreased below the pressure in said train brake pipe,
 (e) a minimum reduction reservoir,
 (f) an electro-responsive valve device operable to one position to effect charging of said equalizing reservoir and operable to another position to establish a restricted communication between said equalizing reservoir and said minimum reduction reservoir to effect a reduction in the pressure in said equalizing reservoir and on one side of said movable abutment by flow of fluid under pressure therefrom to said minimum reduction reservoir,
 (g) a double check valve device having inlet ports at its opposite ends and a restricted side outlet for restricting the rate of flow of fluid under pressure therethrough to a rate substantially equal to a service rate of brake pipe reduction,
 (h) a fluid pressure operated cut-off valve device operable to a cut-off position by fluid under pressure supplied to said minimum reduction reservoir upon the pressure therein reaching a chosen value,
 (i) a first conduit connecting said minimum reduction reservoir to said cut-off valve device,
 (j) a second conduit connecting said cut-off valve device to one end of said double check valve device, and
 (k) a third conduit connecting said exhaust valve means to the other end of said double check valve device,
 (l) said double check valve device being operable to shuttle back and forth to vent fluid under pressure from that one of said second and third conduits that is at the higher pressure until said cut-off valve device is operated to its cut-off position whereupon said double check valve device is rendered operative to continuously open said third conduit to atmosphere via said restricted side outlet outlet thereby enabling continuous venting of fluid under pressure from said train brake pipe to atmosphere at a service rate until the pressure in said brake pipe and on the opposite side of said movable abutment is reduced to substantially the reduced pressure in said equalizing reservoir resulting from equalization of pressures between said equalizing reservoir and said minimum reduction reservoir occurring subsequent to operation of said cut-off valve device to close communication between said first and second conduits.

10. A locomotive fluid pressure brake apparatus, as claimed in claim 9, further characterized in that said double check valve device and said relay valve device cooperate in such a manner that the amount of reduction in brake pipe pressure effected by the operation of said relay valve device varies in accordance with the degree of brake pipe pressure gradient extending from the locomotive toward the last car in the train at the time said electro-pneumatic valve device is operated from its one to its said another position.

References Cited by the Examiner

WABCO Instruction Pamphlet No. G–g–5071–12, April 1964.

EUGENE G. BOTZ, *Primary Examiner.*